United States Patent

Shoji

Patent Number: 5,694,485
Date of Patent: Dec. 2, 1997

[54] OUTPUTTING METHOD AND APPARATUS WHICH REUSES ALREADY-DEVELOPED OUTPUT PATTERNS

[75] Inventor: Atsushi Shoji, Yokohama, Japan

[73] Assignee: Canon Kabushiki Kaisha, Tokyo, Japan

[21] Appl. No.: 441,872

[22] Filed: May 16, 1995

Related U.S. Application Data

[63] Continuation of Ser. No. 151,043, Nov. 12, 1993, abandoned, which is a continuation of Ser. No. 704,214, May 22, 1991, abandoned.

[30] Foreign Application Priority Data

May 22, 1990 [JP] Japan .................. 2-130306

[51] Int. Cl.$^6$ .................. G06K 9/46; G06K 1/00; G06F 15/00
[52] U.S. Cl. .................. 382/190; 395/110; 395/115; 395/150
[58] Field of Search .................. 345/141, 192, 345/193; 395/109, 110, 112, 115, 116, 150, 151; 382/181, 190

[56] References Cited

U.S. PATENT DOCUMENTS

| | | | |
|---|---|---|---|
| 4,811,242 | 3/1989 | Adachi | 400/61 |
| 4,812,999 | 3/1989 | Ohara | 400/61 |
| 4,825,405 | 4/1989 | Makino et al. | 400/61 |
| 4,879,666 | 11/1989 | Kembo | 395/110 |
| 4,944,614 | 7/1990 | Tanaka | 400/76 |
| 4,949,287 | 8/1990 | Yamaguchi et al. | 400/61 |
| 5,018,883 | 5/1991 | Fujita | 395/109 |
| 5,041,994 | 8/1991 | Lahey et al. | 395/110 |
| 5,044,790 | 9/1991 | Kawamura | 400/121 |
| 5,045,880 | 9/1991 | Evanitsky et al. | 355/200 |
| 5,083,162 | 1/1992 | Hanamoto et al. | 355/326 |
| 5,103,303 | 4/1992 | Shoji et al. | 358/470 |
| 5,113,229 | 5/1992 | Higashio et al. | 355/200 |
| 5,121,162 | 6/1992 | Iwamoto | 355/200 |
| 5,159,546 | 10/1992 | Inoue et al. | 355/200 |
| 5,172,167 | 12/1992 | Ito | 355/200 |
| 5,220,645 | 6/1993 | Nakajima | 395/115 |
| 5,293,477 | 3/1994 | Matoba | 345/192 |
| 5,313,573 | 5/1994 | Takahama | 345/141 |

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

An outputting apparatus comprises: a discriminating circuit to discriminate whether the same pattern as the pattern to be developed at a predetermined position has already been developed in an outputting memory or not; a copying device to copy the same pattern to the predetermined position when the same pattern which has already been developed exists; a memory to store code information, decoration information, and developing position information of the pattern developed in the outputting memory; a cache memory to store patterns whose use frequencies are high; and a deciding circuit to decide whether the pattern in the outputting memory doesn't overlap another pattern or not. A process to develop a character symbol pattern into the outputting memory can be efficiently executed.

36 Claims, 8 Drawing Sheets

FIG.5
FIG.7
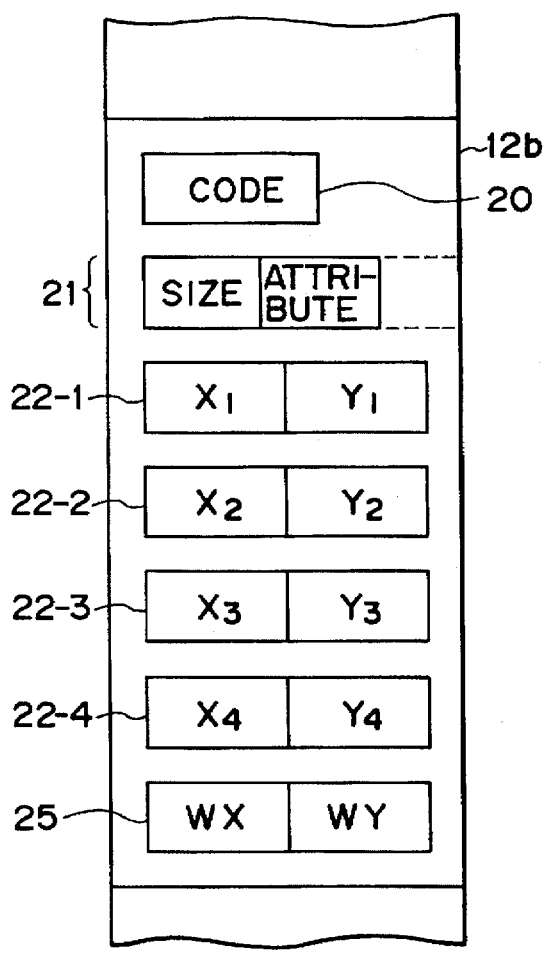
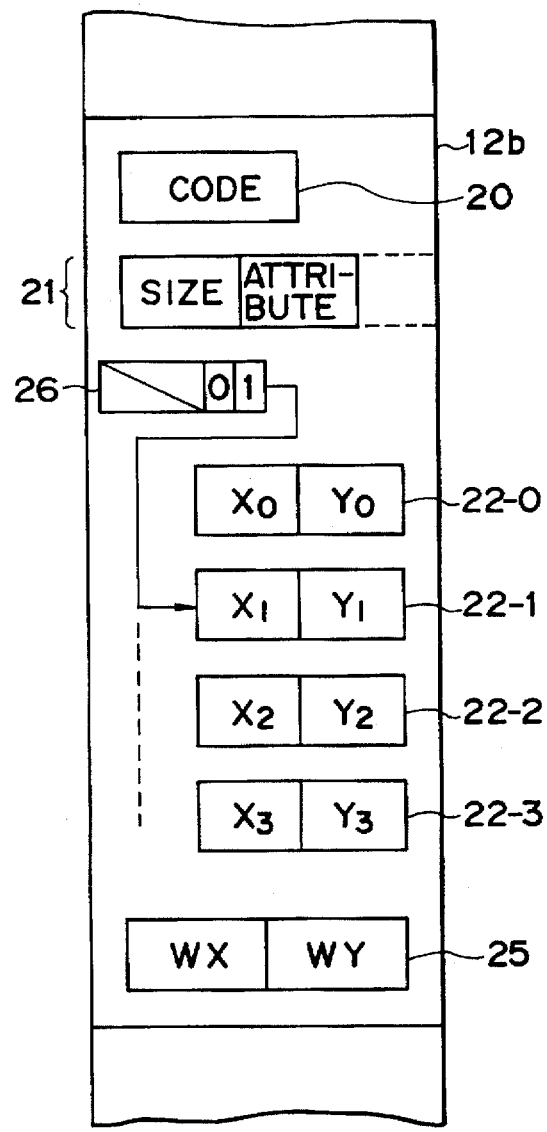

OUTPUTTING METHOD AND APPARATUS WHICH REUSES ALREADY-DEVELOPED OUTPUT PATTERNS

This application is a continuation of application Ser. No. 08/151,043 filed Nov. 12, 1993, now abandoned, which is a continuation of application Ser. No. 07/704,214, filed May 22, 1991, now abandoned.

BACKGROUND OF THE INVENTION

1. Field of the Invention

The present invention relates to a pattern developing method and, more particularly, to outputting method and apparatus in which character symbol patterns corresponding to information comprising character symbol codes and their decoration data which have been supplied are generated and the character symbol patterns are sequentially developed at the relevant positions in an outputting memory.

2. Related Background Art

In recent years, due to the development of a DTP (Desk Top Publishing), a more complicated print format is required and many characters of different sizes are needed.

To individually prepare images of tens of kinds of character sizes for this purpose, a memory of an extremely large capacity is necessary, so that an efficiency is low. To solve such a drawback, in recent years, there is used a method whereby an outline or a frame of a character is detected as a set of numerical value coordinates and is developed by a numerical value arithmetic operation as necessary and is converted into an image and is generated.

Such character data is called an outline font, a vector font, or the like. Generally, however, it takes a fairly long calculating time to develop from the vector data to the image.

In general, therefore, a method called a character cache in which the image of the character which has been developed is temporarily stored and is again used is commonly used.

In the character cache mechanism, however, since it is necessary to store image data, a necessary memory capacity is large. Therefore, in the actual system, many characters cannot be stored.

On the other hand, even if the memory capacity is sufficiently large, retrieving and updating efficiencies of the cache deteriorate. Therefore, it is improper to set the memory capacity to a remarkably large capacity.

Generally, type styles and sizes which are used are different every user or every job. Therefore, in the character cache mechanism of a printer (laser beam printer or the like) which is commonly used by a few host machines, the character cache is updated for a period of time when outputs of a plurality of users are alternately generated. For the user whose printing order has come, a hit ratio of the character patterns registered in the cache memory decreases, so that the effect of the character cache mechanism is not obtained.

As mentioned above, the memory assigned to the character cache is not effectively used and an efficiency is low. Particularly, such a phenomenon is remarkable in Japanese having a large number of characters.

In an image forming apparatus which is frequently accessed from a plurality of users or jobs, it will be understood from the above description that the ordinary character font cache mechanism is not so effective in terms of an amount of consumption of the memory.

SUMMARY OF THE INVENTION

The invention is made in consideration of the above conventional technique and it is an object of the invention to provide outputting method and apparatus which can efficiently execute a developing process of character symbol patterns for an outputting memory.

A pattern developing method of the invention to solve the foregoing problems has the following construction. That is, in a pattern developing method whereby character symbol patterns corresponding to information comprising character symbol codes and their decoration data which have been supplied are generated and the character symbol patterns are sequentially developed at relevant positions in an outputting memory, there are provided outputting method and apparatus comprising: discriminating means which is constructed in a manner such that when a character symbol pattern corresponding to target information is developed into the outputting memory, a check is made to see if the same pattern as the target character symbol pattern has already been developed in the outputting memory or not; and copying means for copying the same pattern to the developing position of the target character symbol pattern when it is discriminated by the discriminating means that the same pattern has already been developed.

According to the invention, there are provided outputting method and apparatus in which when it is determined that the same pattern as a character symbol pattern corresponding to target information has already been developed in an outputting memory before then, such a character pattern is not newly generated but the same pattern is copied to a developing position of the target character symbol pattern.

BRIEF DESCRIPTION OF THE DRAWINGS

FIG. 5 is a diagram showing a character attribute area in the second embodiment;

FIG. 7 is a diagram showing a character attribute area in the third embodiment;

DETAILED DESCRIPTION OF THE PREFERRED EMBODIMENTS

An embodiment of the invention will be described in detail hereinbelow with reference to the drawings. The invention can be applied to an apparatus or a system or can be also accomplished by supplying a program to an apparatus or a system.

Figure 1:
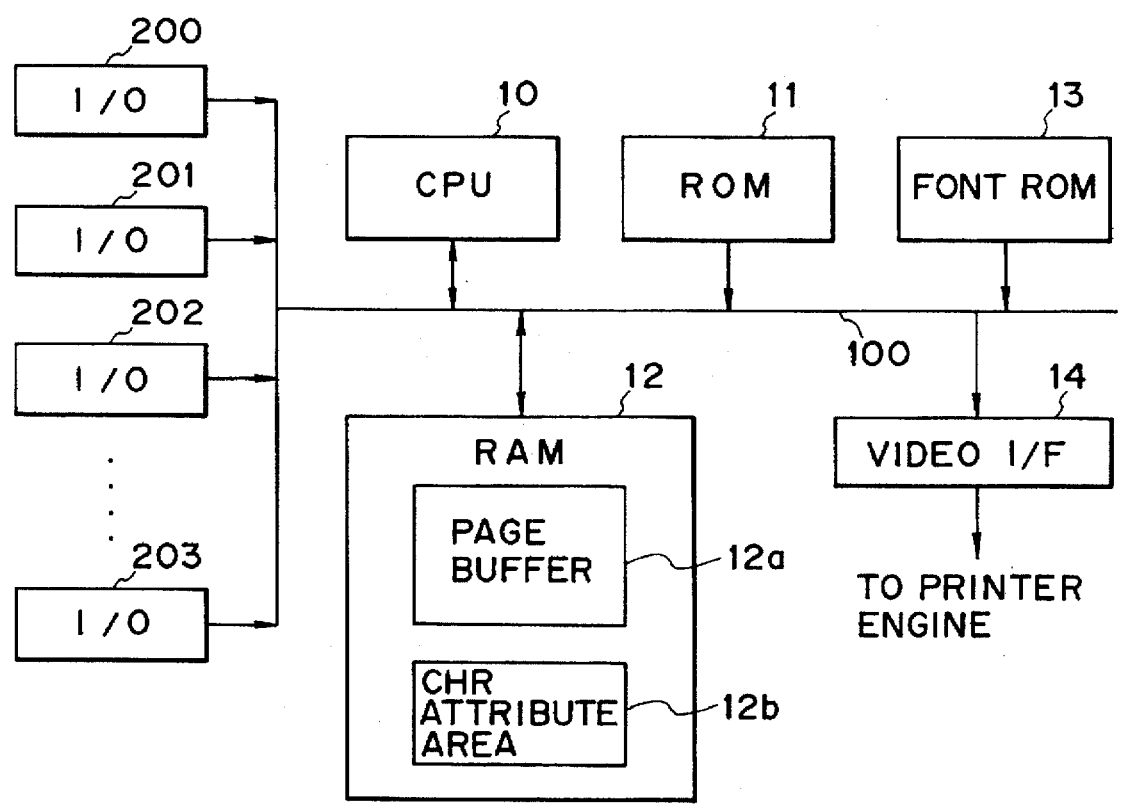
FIG. 1 is a block constructional diagram of a laser beam printer of an embodiment.

FIG. 1 shows a block constructional diagram of an image processing section of a laser beam printer of an embodiment.

In the diagram, reference numeral 10 denotes a CPU to control a whole apparatus; 11 a ROM in which operation processing procedures (flowcharts of FIGS. 3, 6, and 8) of the CPU 10 have been stored; 12 a, RAM which is used as a work area of the CPU 10 and has a page buffer 12a to develop image data of one page and a character attribute area 12b as shown in the diagram; 13 a font ROM in which vector font data (data of the coordinate format) has been stored; 14 a video interface (video I/F) to supply the data which has been developed in the page buffer 12a to a printer engine section (not shown) as a video signal; and 200 to 203 input/output units (hereinafter, abbreviated to I/O) to receive print data from an outside. A plurality of host computers can be connected as shown in the diagram. Each of the above component elements is electrically connected to a system bus 100 (comprising a data bus, an address bus, and a control bus).

In the above construction, the print data which has been received through the I/O is analized and a character pattern is generated in accordance with a designated control command and developed into the page buffer 12a. After the image data of one page was developed into the page buffer 12a, the image data is sequentially supplied to the printer engine through the video I/F 14. It is now assumed that the operation of the printer engine is executed in accordance with a well-known electrophotograph technique. The operation is not described in detail here.

Figure 2:
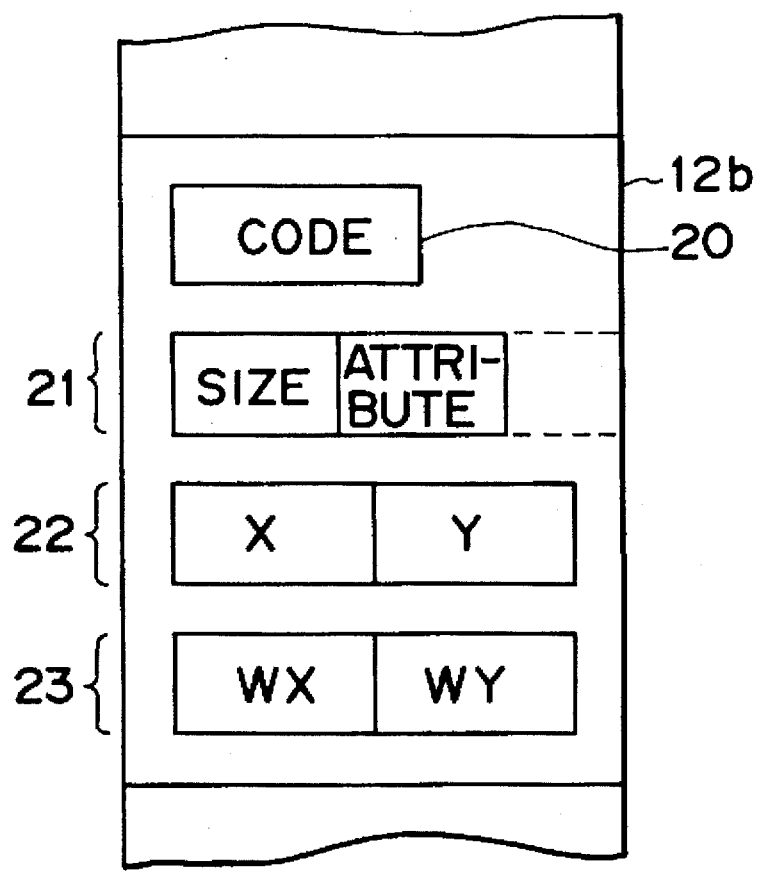
FIG. 2 is a diagram showing an example of a character attribute area in the embodiment.

FIG. 2 shows the content in the character attribute area 12b of the embodiment.

Among the character patterns to be developed into the page buffer 12a, attribute information of characters which are not yet drawn is stored into the character attribute area 12b. The diagram shows the content of the attribute information corresponding to one of those characters.

As shown in the diagram, one attribute information includes: a code 20 to store a character code; information 21 regarding a size of character and an attribute such as a tilted type and the like; a coordinate position 22 (X and Y coordinates in the page buffer 12a or an address and bit position information) in the page buffer 12a of the character pattern; and size information 23 in the vertical and lateral directions of a rectangular area of the character pattern.

Figure 4:
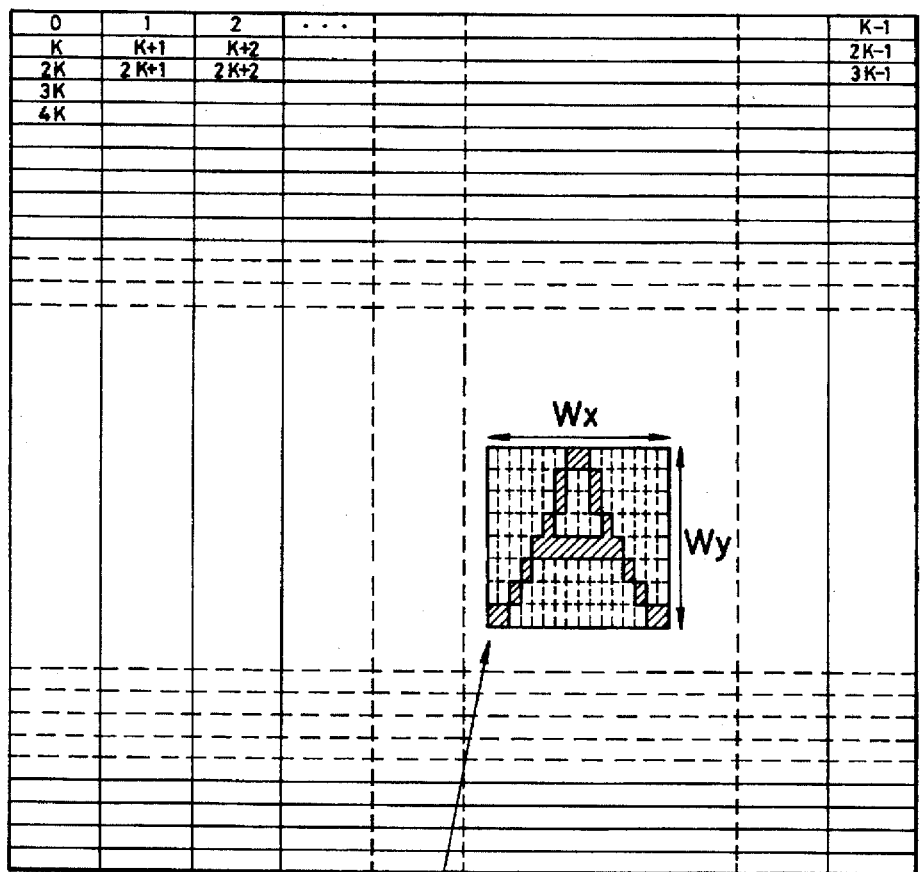
FIG. 4 is a diagram showing the relation between a page buffer and a character attribute area in the embodiment.
Figure 4:
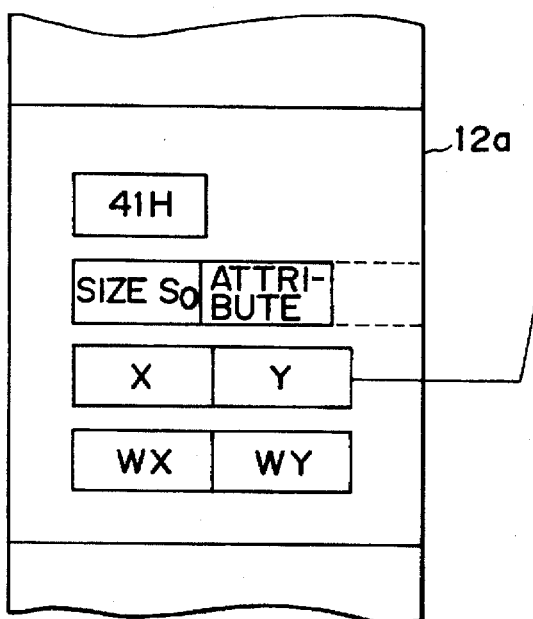

FIG. 4 shows an example of a mapping of the page buffer 12a.

The address continuously increases in the X direction and the address increases by "K" at a time in the Y direction. Bits in a word are arranged in a line in the lateral direction. For instance, in the case of forming an image for a printer to output the image onto a paper of the A4 size at a resolution of 300 d.p.i., coordinate points such as X=2500 and Y=3600 are necessary. Therefore, assuming that one word consists of 16 bits, a value of K is set to about 160.

Data of a rectangular area is transferred on a bit unit basis instead of a simple word unit basis, so that a bit shift or the like is needed. However, in the recent CPU, a command for such a bit shift or the like is supported and the data can be processed at a high speed. A high-speed process can be realized by adding a hardware for a graphic process or a special LSI as necessary.

A procedure for drawing a character in the embodiment will now be described with reference to a flowchart of FIG. 3.

First, in step S1, a check is made to see if a character of the same character code and the same attribute (including the size) as those of a character to be drawn (developed) has already been developed in the page buffer 12a or not by retrieving the character attribute area 12b.

If the character having the same character code and the same attribute exists, step S2 follows and the coordinates of such a character are calculated. Step S3 then follows and an area to be transferred is determined on the basis of the size information 23 in the vertical and lateral directions of the rectangular area of the character pattern. After that, in step S4, the pattern of the rectangular image obtained at the developing position (printing position) of the target character is transferred.

In the page buffer 12a of the construction as shown in FIG. 4, the addresses in the X direction are continuous. Even in the case of transferring by a hardware or by a software, the construction is very simple. However, the address in the Y direction is added on a predetermined value unit basis. According to the method of the invention, a common value can be used as an addition address value in the Y direction because the transfer destination side of the data transfer and the data transferring side are in the same page memory, so that the construction is simple. However, different addition values are needed in the case of the conventional character cache mechanism.

If it is determined in step S1 that the target character is not yet registered in the character attribute area 12b, that is, it is not yet cached, step S5 follows and the printing position of the target character in the page buffer 12a is calculated. In step S6, a check is made to see if another figure has been drawn in the rectangular area in the page buffer 12a calculated from the attribute data of the designated character or not. If such a figure has already existed at the position where the data is newly printed (in the case of collision), a normal character image cannot be transferred at a stage at which the same character will be developed later. In such a case, therefore, the processing routine advances to step S9 and the character pattern is merely drawn at the calculated position.

If any other figure doesn't exist in the developing area of the target character, namely, if the character pattern can be used as an image of a character cache, step S7 follows and the vector data is selected on the basis of the character code and the attribute data and the character is drawn in the page memory (the same as step S9). In step S8, further, the attribute data is registered into each area in the character attribute area 12b.

The laser beam printer in the embodiment draws not only characters but also graphics. If the necessity of the writing operation has occurred in the rectangular area registered in the character attribute area 12b when a graphic pattern is drawn, the image of the character is broken. In such a case, by eliminating the information regarding such a character from the area 12b, the transfer of the wrong image is prevented. In this case, the collision of the character and the figure is detected by comparing the position of the image of the character of the attribute data with the rectangular area instead of the inside of the page buffer 12a. This is because in the case where a character pattern has been printed onto a blank portion in the rectangular area, the collision cannot be detected in the page memory.

A graphic process such as drawing of a curve, painting, or the like can be finally dissolved until a combination of drawing of straight lines. By comparing the straight line and the rectangle, the collision of the figure and the character is detected.

[Second Embodiment]

In the foregoing first embodiment, in the case where after a charachter had been drawn, a graphic pattern has been overwritten onto the rectangular area of the character, the character is deleted from the storage area of the character attribute, so that the cache effect becomes invalid. That is, if the character is again needed, it is necessary to develop from the vector data to the image.

In the second embodiment, therefore, a plurality of coordinate positions 22 are prepared in the character attribute area 12b. Even if one character has collided with the graphic pattern and has been deleted, the data of another image area construction is used to thereby continue the cache effect.

In the above case, the character attribute area 12b has a content as shown in FIG. 5 In the diagram, four coordinate positions 22-1 to 22-4 are provided. However, the number of position data can be varied within an arbitrary range.

Among the four position data, as position data which doesn't designate a character in the page buffer 12a, special coordinate values or the like which actually cannot exist are stored, thereby enabling such position data to be distinguished.

Figure 3:
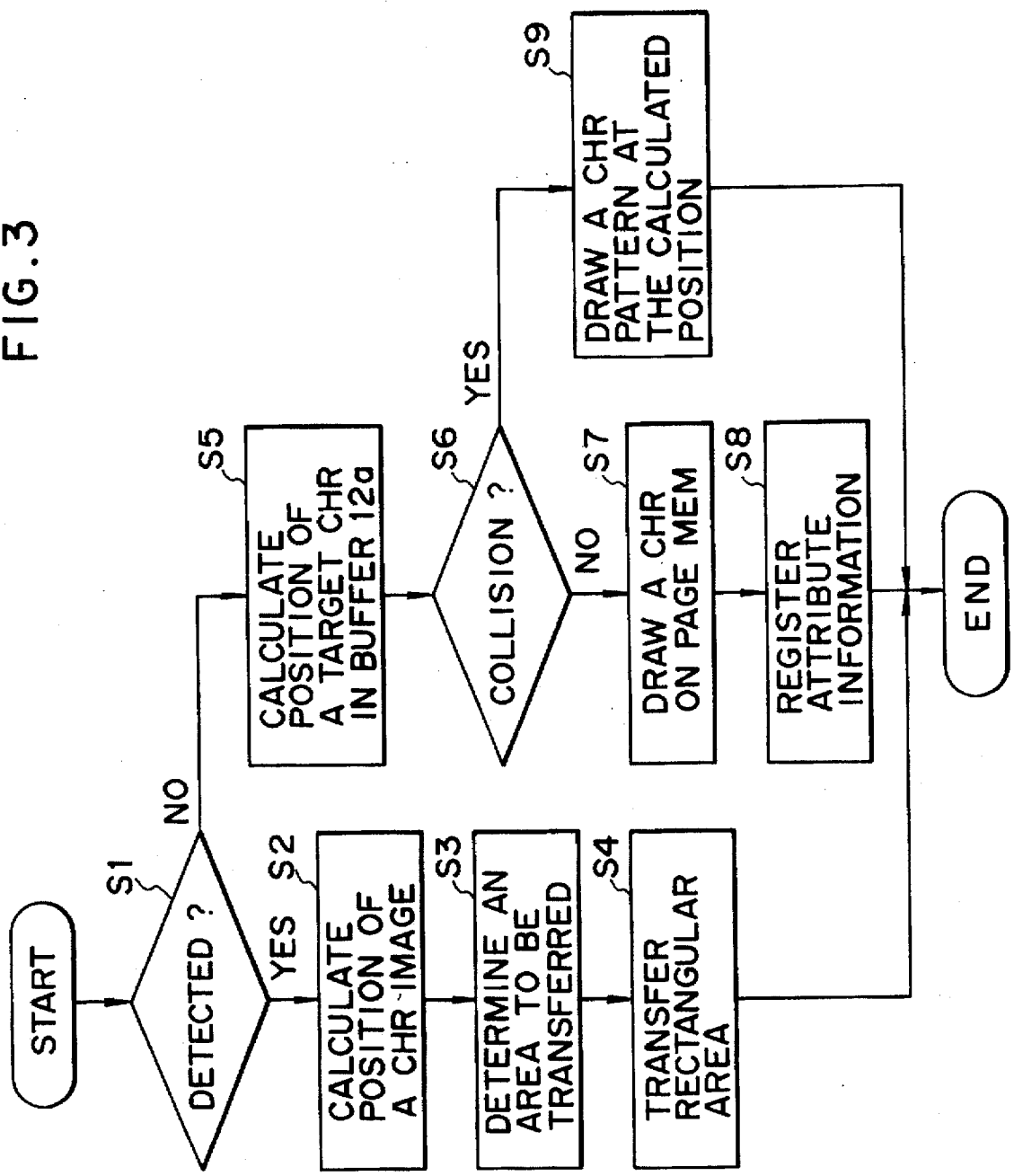
FIG. 3 is a flowchart for a developing process of a character pattern in an apparatus of the embodiment.
Figure 6:
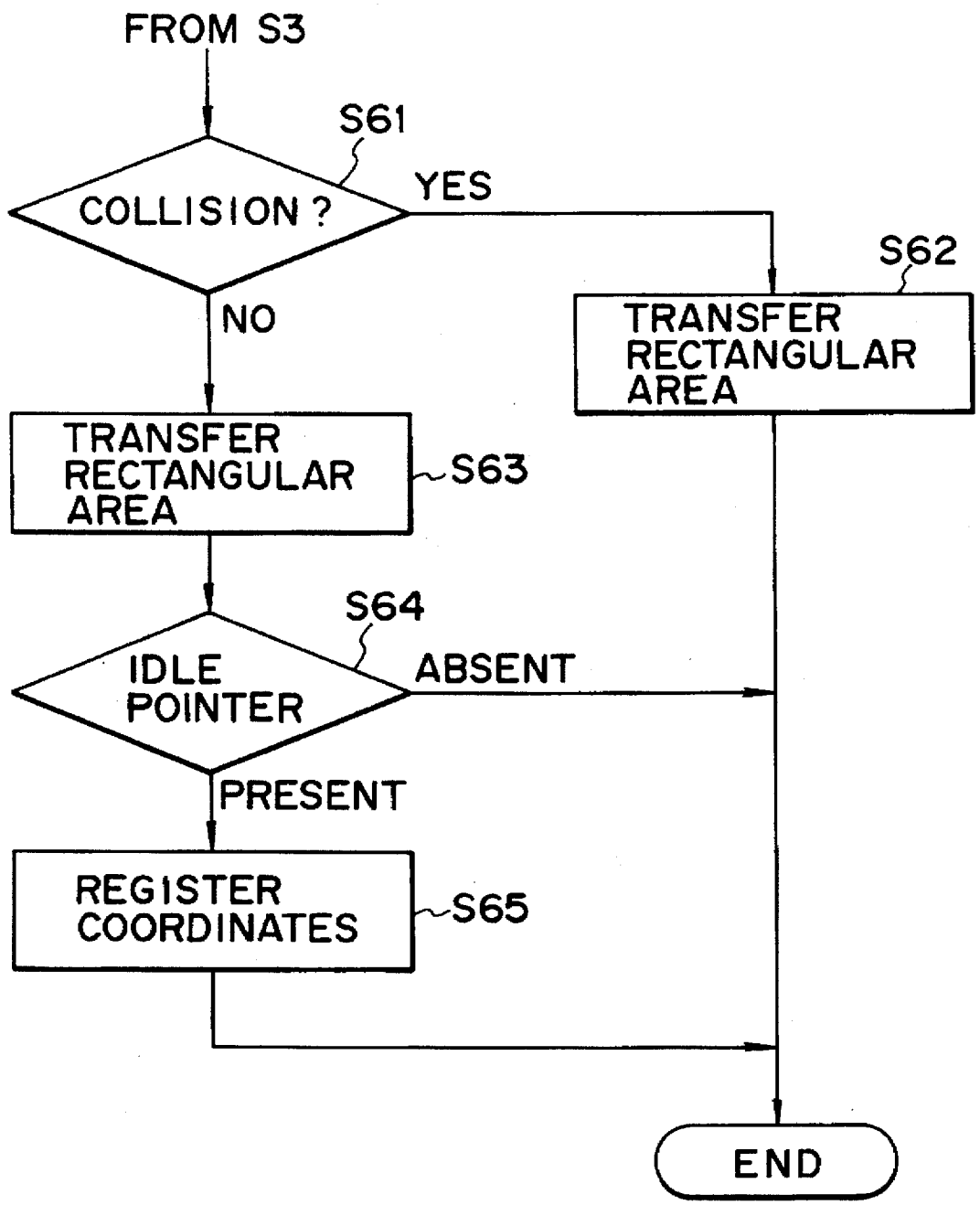
FIG. 6 is a flowchart showing changed portions of a character pattern developing process in the second embodiment.

In the above case, the process in step S4 in the printing procedure of FIG. 3 is changed as shown in FIG. 6.

In step S61, a check is made to see if another figure exists at the developing position (printing position) of the target character or not. If the presence of another figure has been detected, it is meaningless to register the development coordinates of the target character. Therefore, in this case, the processing routine advances to step S62 and the pattern of the rectangular area stored at a coordinate position 22-i in the character attribute area 12b is transferred to the developing position of the target character. At this time, since another figure exists near the developing position of the target character, when the character pattern is developed at such a position, the OR is calculated and the character pattern is developed. This is because unless otherwise, another figure at that position is deleted.

On the other hand, if the existence of another figure is not detected at the developing position (printing position) of the target character in step S61, step S63 follows and a process similar to step S62 is executed. In this case, there is no need to calculate the OR. After that, step S64 follows and a check is made to see if in the table of the target character in the character attribute area 12b, an idle pointer—which indicates nothing exists at the coordinate positions 22-1 to 22-4 or not. If there is no idle pointer, the processing routine if finished. If an idle pointer exists, step S65 follows and the coordinates of the development destination side of the target character are registered to the idle pointer.

By the above processes, even if a plurality of data of character images have been prepared and even if either one of the character images has collided with another figure, the cache effect is continued.

In this case, if all of the coordinate position areas 22-1 to 22-4 are empty, the whole attribute data of the characters is eliminated from the character attribute area 12b.

By the above construction, a ratio at which the cache effect of the character is continued rises and the cache can be efficiently used.

[Third embodiment]

Generally, a probability such that a character drawn collides with another figure drawn and cannot be used as a cache image is higher for a character which has been drawn at the initial stage. Therefore, as a third embodiment, there is shown an example in which the position data of a character is sequentially replaced to the coordinates of the new character, thereby maintaining the effect of the cache.

In the third embodiment, a pointer to update the address is further added to the attribute data of the character. FIG. 7 shows a structure of the attribute data in the character attribute area 12b in the third embodiment.

One of a plurality of coordinate position data is indicated by a pointer 26 to update the address. In the third embodiment, if the pointer of the address in the page buffer in which the character pattern has been stored is set to a value which is the power of 2, the system is simplified. In the third embodiment, therefore, four coordinate positions 22-0 to 22-3 shown in the diagram are set and a counter of two bits is used as a pointer 26.

Each time the cached character is used, a check is made to see if the new character drawn has collided with another figure or not (corresponding to step S6 in FIG. 3 and step S61 in FIG. 6). If NO, the coordinates of the character image indicated by the pointer 26 are updated to the coordinates of the character which has newly been drawn and the value of the pointer 26 is counted up.

Figure 8:
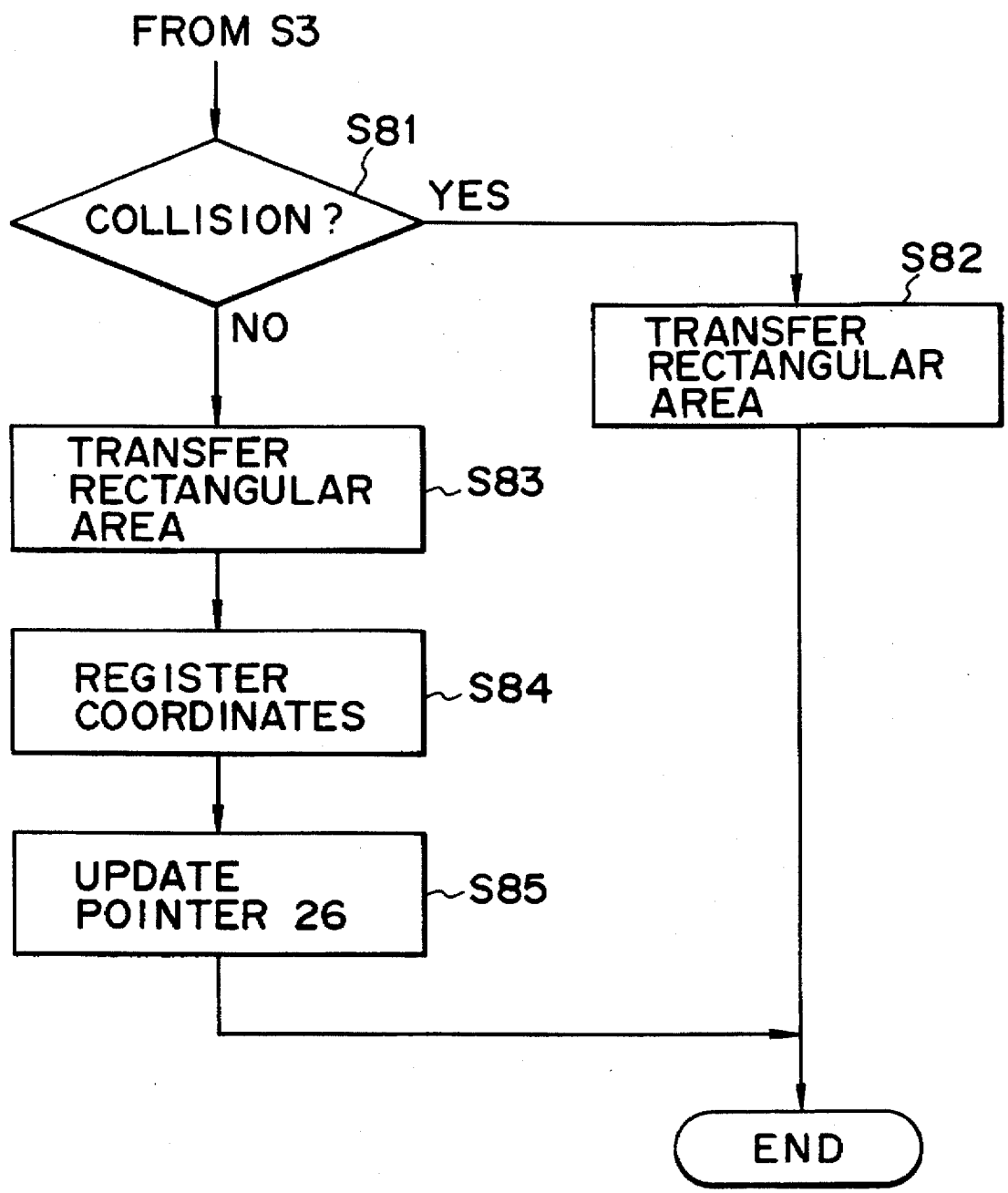
FIG. 8 is a flowchart showing changed portions of a character pattern developing process in the third embodiment.

In the case of the third embodiment, the process in step S4 in FIG. 3 is likewise changed as shown in FIG. 8.

In step S81, the coollision is detected and a check is made to see if the developing position area of the target character can be registered as a character image on the transferring side or not. In steps S82 and S83, the rectangular area of the character image is transferred to the developing position (printing position). In the case where the newly developed character is transferred as a source of the character image, step S84 follows and the coordinate position which has at present been developed is registered into the coordinate position 22-i indicated by the pointer 26. In the next step S85, the value of the pointer 26 is counted up so as to indicate the new coordinate position and is updated by the following process.

The address registered as a character cache in the page memory is sequentially updated by the above construction, thereby maintaining the character image. Thus, a probability such that the cache is eliminated further decreases.

[Fourth embodiment]

Generally, when a graphic pattern is drawn, it takes a long arithmetic operating time to detect the collision with the rectangular area of a character image. Therefore, if a character is first drawn (developed) and a graphic pattern is finally drawn to thereby omit the collision detecting step, the processing speed is remarkably improved. In the fourth embodiment, it is possible to select whether the collision detecting step is executed or not by a command given from an external apparatus such as a computer or the like.

Practically speaking, a variable F indicating whether the collision detection is performed or not is provided in a predetermined address in the RAM. A value of the variable F is set to ON or OFF by an ON command of the collision detection and an OFF command of the collision detection which are supplied from the input sections shown by the I/O units 200 to 203 in FIG. 1.

Figure 9:
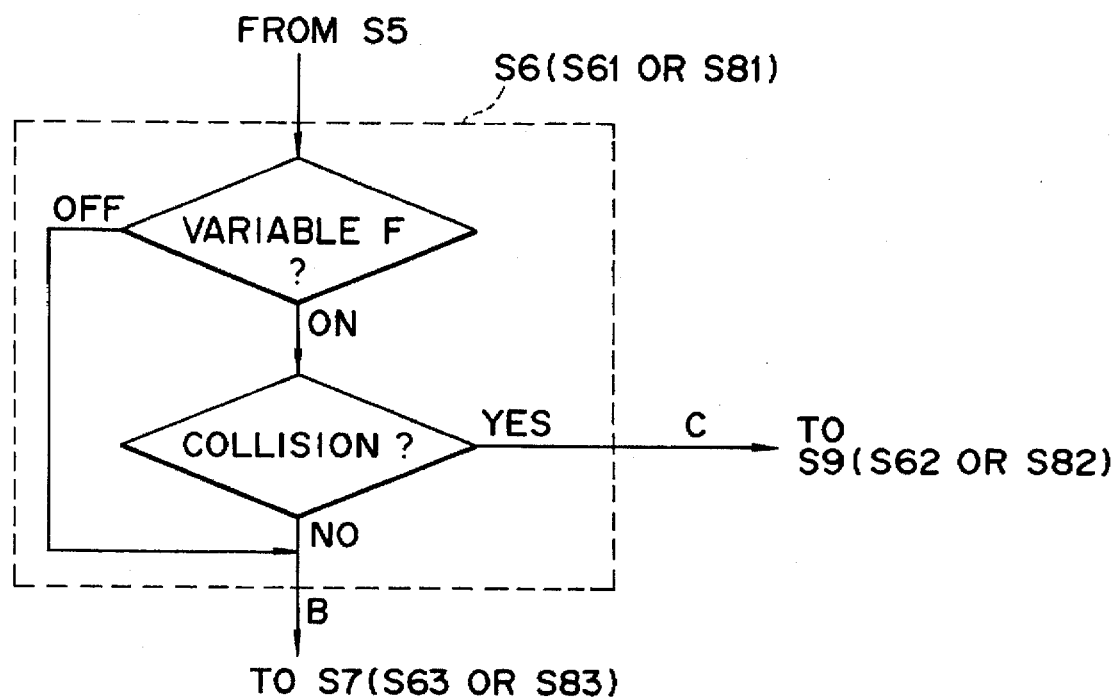
FIG. 9 is a flowchart showing changed portions of a character pattern developing process in the fourth embodiment.

According to the above process, the collision detecting processes shown in step S6 in FIG. 3, step S61 in FIG. 6, step S81 in FIG. 8,. and the like are changed as shown in FIG. 9. That is, in the case where the variable F is set to OFF and the collision detecting routine is not used, a processing routine B corresponding to the case where no collision occurs is always executed.

When the variable F is set to ON, that is, if the collision detecting process is executed, the ordinary collision detecting routine is performed. The occurrence of the collision is discriminated and either one of the process B in the case where no collision occurs and the process C in the case where the collision has occurred is executed.

There is no need to detect the collision under a special condition such that a character is printed after all of the figures were drawn or that, contrarily, a figure is drawn after all of the characters were printed or the like. Therefore, as a default value of the variable F, ON is selected and, ordinarily, the collision detecting mechanism is always made operative.

The processing speed of the image forming system can be improved by the fourth embodiment.

According to the embodiment, the memory capacity can be saved and a cache having a high executing performance can be formed. Since it is sufficient to use only the storage area of the character attribute as a use area in the memory, an overflow of the cache hardly occurs in such a page. The producing speed of the character at the first time and the transferring effect of the character can be improved.

In the ordinary character cache mechanism, a rectangular area is provided in the character cache and a character image is first drawn there and, after that, the image is transferred to the print area in the page memory. That is, this is because it takes an additional time corresponding to only such a transferring time according to conventional method.

As described above, according to the invention, to process to develop the character symbol pattern into the outputting memory can be efficiently executed.

It is also possible to combine the ordinary cache memory and the invention and to store characters whose addresses are frequently updated, namely, whose use frequencies are high in the invention into the cache memory.

Figure 10:
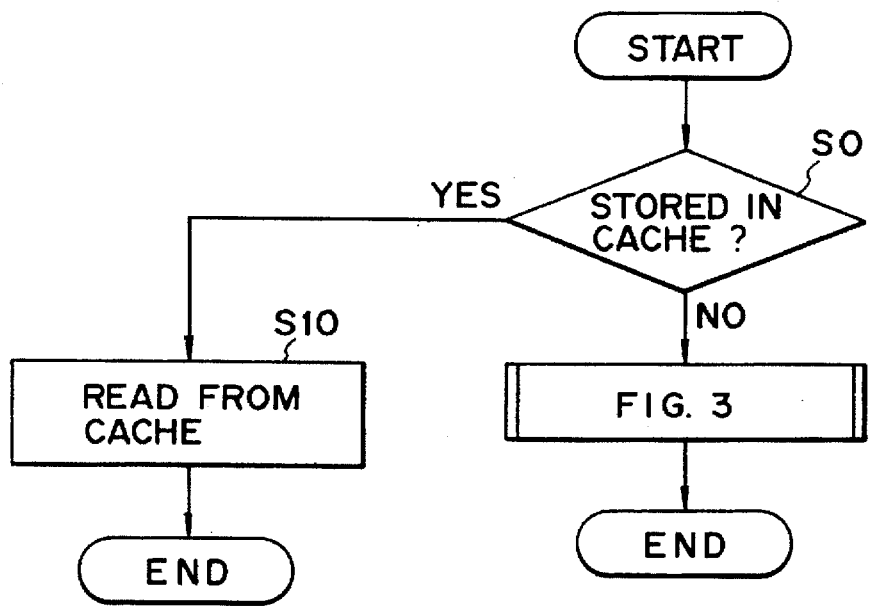
FIG. 10 is a flowchart in the case where a cache memory is added to the invention.

In such a case, retrieval frequency data in step S1 in FIG. 3 is stored in the RAM 12 in FIG. 1 or the like. When the use frequency is relatively high, it is registered into a cache memory (not shown) (provided in, for example, the RAM 12 in FIG. 1). With the above construction, only the necessary minimum number of patterns whose appearing frequencies are very high can be registered into the cache memory. The patterns in the outputting memory other than those patterns are used. Therefore, the conventional drawbacks can be sufficiently solved. In this case, when executing a pattern development, as shown in FIG. 10, a check is first made to see if a pattern to be developed exists in the cache memory or not (step S0 in FIG. 10) before step S1 in FIG. 3 is performed. If YES, the developing process is executed (step S10 in FIG. 10). If NO, a check is made in step S1 in FIG. 3 to see if such a pattern exists in the outputting memory or not.

What is claimed is:

1. An output apparatus comprising:
    memory means for storing character pattern information;
    pattern generating means for generating character pattern information based on vector font data; and
    writing means for writing new character pattern information at a desired position in said memory means using character pattern information previously stored in said memory means if identical character pattern information has already been stored elsewhere in said memory means, and for writing new character pattern information at the desired position in said memory means using character pattern information generated by said pattern generating means in said memory means if no such identical character pattern information is stored elsewhere in said memory means; and
    discriminating means for discriminating whether previously stored character pattern information is already stored at the desired position;
    wherein when said writing means executes a subsequent writing operation for further character pattern information, said writing means executes the subsequent writing operation without using the new character pattern information written at the desired position if said discriminating means discriminates that character pattern information was already stored at the desired position.

2. An apparatus according to claim 1, further comprising registration means for registering a position at which character pattern information written by said writing means is developed.

3. An apparatus according to claim 2, wherein said registration means does not register the position of the new character pattern information when previously stored pattern information is already stored at the desired position in the memory means.

4. An apparatus according to claim 2, wherein said registration means de-registers a registered position in the event that further pattern information is stored at the registered position.

5. An apparatus according to claim 2, wherein said registration means provides for a plurality of positions to be registered, each corresponding to a given character type.

6. An apparatus according to claim 5, wherein a most recently written position is registered for each given character type in preference to a less recently written position.

7. An apparatus according to claim 6, wherein the registration means includes registration spaces for a predetermined number of positions to be registered, each corresponding to each given character type, and update means whereby said registration spaces are updated in sequence.

8. An apparatus according claim 1, further comprising means for outputting the pattern information written in said memory means.

9. An apparatus according to claim 8, wherein said output means comprises a printer.

10. An apparatus according claim 1, further comprising means for instructing whether said discriminating means is to be actuated or not.

11. An apparatus according claim 1, wherein if previously stored pattern information exists in an area where said new character pattern information is to be written, said writing means writes at the desired position using an OR combination of the previously stored pattern information and the new character pattern information.

12. An apparatus according to claim 1, wherein said memory means comprises a page memory.

13. An output method in which memory means is used for storing character pattern information generated from vector font data, the method comprising the steps of:
    determining whether character pattern information which is identical to new character pattern information has previously been stored at a first position in said memory means;
    discriminating whether additional character pattern information has additionally been stored at the first position;
    writing the new character pattern information at a desired position in said memory means using the previously stored identical character pattern information from the first position if both (a) said determining step determines that identical character pattern information has previously been stored at the first position in said memory means, and (b) said discriminating step discriminates that additional character pattern information has not additionally been stored at the first position; and
    writing the new character pattern information at the desired position using character pattern information generated based on vector font data if either (a) said determining step determines that no such identical character pattern information has been stored elsewhere in said memory means, or (b) said discriminating step discriminates that additional character pattern information has already been stored at the first position.

14. A method according to claim 13, wherein the desired position at which the new character pattern information is written is registered.

15. A method according to claim 14, wherein the desired position of the new character pattern information is not registered when additional pattern information is already stored at the desired position.

16. A method according claim 15, wherein a plurality of positions are registered, each corresponding to a given character type.

17. A method according to claim 16, wherein only a most recently written position is registered for each given character type.

18. A method according to claim 17, wherein registration spaces are provided for a predetermined number of positions to be registered, each corresponding to each given character type, and wherein said registration spaces are updated in sequence.

19. A method according claim 14, wherein a registered position is de-registered in the event that subsequently written pattern information is stored at the registered position.

20. A method according claim 13, further comprising the step of outputting the pattern information written in said memory means.

21. A method according to claim 20, wherein said outputting is by means of a printer.

22. A method according to claim 13, further comprising a preliminary step of instructing whether said discriminating step is to be actuated or not.

23. A method according to claim 13, wherein if previously stored pattern information exists in an area where said new character pattern information is to be written, said writing steps write at the desired position using an OR combination of the previously stored pattern information and the new character pattern information.

24. A method according to claim 13, wherein said memory means comprises a page memory.

25. Computer-executable process steps stored in a computer-readable memory medium, the process steps for storing character pattern information generated from vector font data in a memory means, said process steps comprising:

a determining step to determine whether character pattern information which is identical to new character pattern information has previously been stored at a first position in said memory means;

a discriminating step to discriminate whether additional character pattern information has additionally been stored at the first position;

a first writing step to write the new character pattern information at a desired position in said memory means using the previously stored identical character pattern information from the first position if both (a) said determining step determines that identical character pattern information has previously been stored at the first position in said memory means, and (b) said discriminating step discriminates that additional character pattern information has not additionally been stored at the first position; and a second writing step to write the new character pattern information at the desired position using character pattern information generated based on vector font data if either (a) said determining step determines that no such identical character pattern information has been stored elsewhere in said memory means, or (b) said discriminating step discriminates that additional character pattern information has already been stored at the first position.

26. Computer-executable process steps according to claim 25, wherein the desired position at which the new character pattern information is written is registered.

27. Computer-executable process steps according to claim 26, wherein the desired position of the new character pattern information is not registered when additional pattern information is stored at the desired position.

28. Computer-executable process steps according claim 27, wherein a plurality of positions are registered, each corresponding to a given character type.

29. Computer-executable process steps according to claim 28, wherein only a most recently written position is registered for each given character type.

30. Computer-executable process steps according to claim 29, wherein registration spaces are provided for a predetermined number of positions to be registered, each corresponding to each given character type, and wherein said registration spaces are updated in sequence.

31. Computer-executable process steps according claim 26, wherein a registered position is de-registered in the event that subsequently written pattern information is stored at the registered position.

32. Computer-executable process steps according claim 25, further comprising the step of outputting the pattern information written in said memory means.

33. Computer-executable process steps according to claim 32, wherein said outputting is by means of a printer.

34. Computer-executable process steps according to claim 23, further comprising a preliminary step of instructing whether said discriminating step is to be actuated or not.

35. Computer-executable process steps according to claim 25, wherein if previously stored pattern information exists in an area where said new character pattern information is to be written, said writing steps write at the desired position using an OR combination of the previously stored pattern information and the new character pattern information.

36. Computer-executable process steps according to claim 25, wherein said memory means comprises a page memory.

* * * * *

UNITED STATES PATENT AND TRADEMARK OFFICE
CERTIFICATE OF CORRECTION

PATENT NO. : 5,694,485

DATED : December 2, 1997

INVENTOR(S) : Atsushi Shoji

It is certified that error appears in the above-identified patent and that said Letters Patent is hereby corrected as shown below:

```
     Column 1, line 20, delete "a".

Column 3, line 2, change "a, RAM" to --a RAM--; and
               line 16, change "analized" to
--analyzed--.

Column 4, line 64, change "charachter" to
--character--.

Column 5, line 42, change "routine if" to
--routine is--.

Column 6, line 20, change "coollision" to
--collision--.

Column 7, line 24, change "to" (second occurrence) to
--the--.
```

UNITED STATES PATENT AND TRADEMARK OFFICE
CERTIFICATE OF CORRECTION

PATENT NO. : 5,694,485
DATED : December 2, 1997
INVENTOR(S) : Atsushi Shoji

It is certified that error appears in the above-identified patent and that said Letters Patent is hereby corrected as shown below:

Claim 28, column 10, line 25, change "according" to --according to--.

Claim 31, column 10, line 36, change "according" to --according to--.

Claim 32, column 10, line 40, change "according" to --according to--.

Claim 34, column 10, line 46, change "23," to --25,--.

Signed and Sealed this

Twenty-fourth Day of November, 1998

Attest:

BRUCE LEHMAN

Attesting Officer     Commissioner of Patents and Trademarks